United States Patent
Tai et al.

(10) Patent No.: US 10,473,957 B2
(45) Date of Patent: Nov. 12, 2019

(54) REFLECTIVE DISPLAY APPARATUS

(71) Applicant: E Ink Holdings Inc., Hsinchu (TW)

(72) Inventors: Sheng-Chieh Tai, Hsinchu (TW);
Chao-Chun Cheng, Hsinchu (TW);
Ching-Huan Liao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 5 days.

(21) Appl. No.: 15/788,810

(22) Filed: Oct. 20, 2017

(65) Prior Publication Data
US 2018/0143459 A1    May 24, 2018

Related U.S. Application Data

(60) Provisional application No. 62/426,185, filed on Nov. 23, 2016.

(30) Foreign Application Priority Data

Jun. 15, 2017   (CN) .......................... 2017 1 0450857

(51) Int. Cl.
*G02F 1/19*        (2019.01)
*G02F 1/00*        (2006.01)
(Continued)

(52) U.S. Cl.
CPC .............. *G02F 1/0063* (2013.01); *G02B 1/11* (2013.01); *G02B 6/0065* (2013.01); *G02F 1/133553* (2013.01); *G02F 1/133615* (2013.01); *G02F 1/167* (2013.01); *G02F 1/19* (2013.01); *G02F 2001/133616* (2013.01); *G02F 2203/02* (2013.01)

(58) Field of Classification Search
CPC   G02F 1/0063; G02F 1/19; G02B 1/11; G02B 6/0065
See application file for complete search history.

(56) References Cited

U.S. PATENT DOCUMENTS 9,429,764 B2     8/2016  Harrold et al.
2003/0160754 A1  8/2003  Hanson et al.
(Continued)

FOREIGN PATENT DOCUMENTS

CN        103542276       1/2014
TW        201222102       6/2012
(Continued)

OTHER PUBLICATIONS

"Office Action of Taiwan Counterpart Application," dated Nov. 14, 2017, p. 1-4.
(Continued)

*Primary Examiner* — Anabel Ton
(74) *Attorney, Agent, or Firm* — JCIPRNET (57) ABSTRACT

A reflective display apparatus including a reflective display panel, a transparent cover plate, and a light source is provided. The transparent cover plate is disposed on one side of the reflective display panel. An air gap exists between the reflective display panel and the transparent cover plate. The light source is disposed between the reflective display panel and the transparent cover plate, and a light emitted by the light source travels towards the air gap before irradiating the transparent cover plate or the reflective display panel.

16 Claims, 5 Drawing Sheets

(51) Int. Cl.
*G02B 1/11* (2015.01)
*F21V 8/00* (2006.01)
*G02F 1/1335* (2006.01)
*G02F 1/167* (2019.01)

(56) References Cited

U.S. PATENT DOCUMENTS

| | | |
|---|---|---|
| 2012/0212975 A1 | 8/2012 | Masuda |
| 2014/0056028 A1* | 2/2014 | Nichol ................. G02B 6/0028 362/611 |
| 2014/0146563 A1 | 5/2014 | Watanabe et al. |
| 2015/0234507 A1* | 8/2015 | Chun .................... G06F 1/1616 345/173 |
| 2015/0253487 A1* | 9/2015 | Nichol ................. G02B 6/0036 362/610 |
| 2016/0187575 A1 | 6/2016 | Fan |
| 2016/0313494 A1* | 10/2016 | Hamilton ............. G02B 6/0068 |
| 2017/0111570 A1* | 4/2017 | Yoon ........................ H04B 1/40 |
| 2018/0217670 A1* | 8/2018 | Cho ...................... B60W 50/08 |

FOREIGN PATENT DOCUMENTS

| | | |
|---|---|---|
| TW | 201502609 | 1/2015 |
| TW | 201636718 | 10/2016 |

OTHER PUBLICATIONS

"Office Action of Taiwan Counterpart Application," dated May 14, 2018, p. 1-5.

* cited by examiner

REFLECTIVE DISPLAY APPARATUS

CROSS-REFERENCE TO RELATED APPLICATION

This application claims the priority benefits of U.S. provisional application Ser. No. 62/426,185 filed on Nov. 23, 2016 and China application serial no. 201710450857.7, filed on Jun. 15, 2017. The entirety of each of the above-mentioned patent applications is hereby incorporated by reference herein and made a part of this specification.

BACKGROUND OF THE INVENTION

1. Field of the Invention

The invention relates to a display apparatus. More particularly, the invention relates to a reflective display apparatus.

2. Description of Related Art

In a reflective display apparatus, a reflective display panel, for example, an Electro-phoretic display (EPD) panel is used most of the time for reflecting external light to perform image display. As such, an illuminating apparatus in the space may be directly used as a display light source of the reflective display apparatus. Furthermore, in order to enhance display brightness, the reflective display apparatus may be installed in front of the illuminating apparatus. Nevertheless, the installation of the illuminating apparatus is limited to many other conditions; for example, the illuminating apparatus has to be installed according to requirements of brightness in the space, the interior design of the space, etc. A favorable display light source is thus unable to be provided for the reflective display apparatus. Therefore, when the illuminating apparatus is directly used as the display light source, problems such as non-uniform lighting areas or insufficient brightness occur easily, resulting in poor display effect of the reflective display apparatus.

SUMMARY OF THE INVENTION

The invention provides a reflective display apparatus which is able to achieve uniform display effect.

A reflective display apparatus provided by the embodiments of the invention includes a reflective display panel, a transparent cover plate, and a light source. The transparent cover plate is disposed on one side of the reflective display panel. An air gap exists between the reflective display panel and the transparent cover plate. The light source is disposed between the reflective display panel and the transparent cover plate, and a light emitted by the light source travels towards the air gap before irradiating the transparent cover plate or the reflective display panel.

In an embodiment of the invention, the light source includes at least one light emitting element. The at least one light emitting element respectively has an optical axis, and the optical axis is parallel to a display surface of the reflective display panel.

In an embodiment of the invention, the transparent cover plate is inclined at an angle relative to the reflective display panel, and the angle is greater than 0 degree and less than 45 degrees.

In an embodiment of the invention, the light source includes at least one light emitting element. A respective half intensity emission angle of the at least one light emitting element is less than 60 degrees.

In an embodiment of the invention, the light source includes at least one light emitting element. A respective optical axis of the at least one light emitting element and the transparent cover plate intersect to form a cross point. An orthogonal projection of the cross point on the reflective display panel is located on a center line of a display surface of the reflective display panel.

In an embodiment of the invention, in a distance perpendicular to the reflective display panel, a shortest distance d1 between the reflective display panel and the transparent cover plate satisfies 0≤d1<W, and W is a height of the at least one light emitting element measured in the direction perpendicular to the reflective display panel.

In an embodiment of the invention, one end of the reflective display panel leans against the transparent cover plate, and the light source is located on another opposite end of the reflective display panel.

In an embodiment of the invention, the reflective display panel is parallel to the transparent cover plate.

In an embodiment of the invention, the light source includes at least one light emitting element. A respective half intensity emission angle of the at least one light emitting element is less than 45 degrees.

In an embodiment of the invention, a distance d2 between the reflective display panel and the transparent cover plate satisfies W<d2<2W, and W is a height of the light emitting element measured in a direction perpendicular to the reflective display panel.

In an embodiment of the invention, the light source includes a first light source and a second light source respectively located on two opposite ends of the transparent cover plate, and an illuminating direction of the first light source is opposite to an illuminating direction of the second light source.

In an embodiment of the invention, the light source includes a first light source, a second light source, and a third light source, and the first light source and the second light source are respectively located on two opposite ends of the transparent cover plate. An illuminating direction of the first light source is opposite to an illuminating direction of the second light source. The third light source is located between the first light source and the second light source to be arranged in a C-letter shape.

In an embodiment of the invention, the light source includes a first light source, a second light source, a third light source, and a fourth light source. The first light source, the second light source, the third light source, and the fourth light source are arranged in a ring shape and surround edges of the transparent cover plate.

In an embodiment of the invention, a functional coated film is formed on a side surface of the transparent cover plate.

In an embodiment of the invention, the transparent cover plate includes a cover plate body and a functional coated film, and the functional coated film is disposed on the cover plate body.

To sum up, in the reflective display apparatus in accordance with the embodiments of the invention, the light emitted by the light source may be uniformly reflected to the reflective display panel through the transparent cover plate, so as to achieve uniform display effect.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
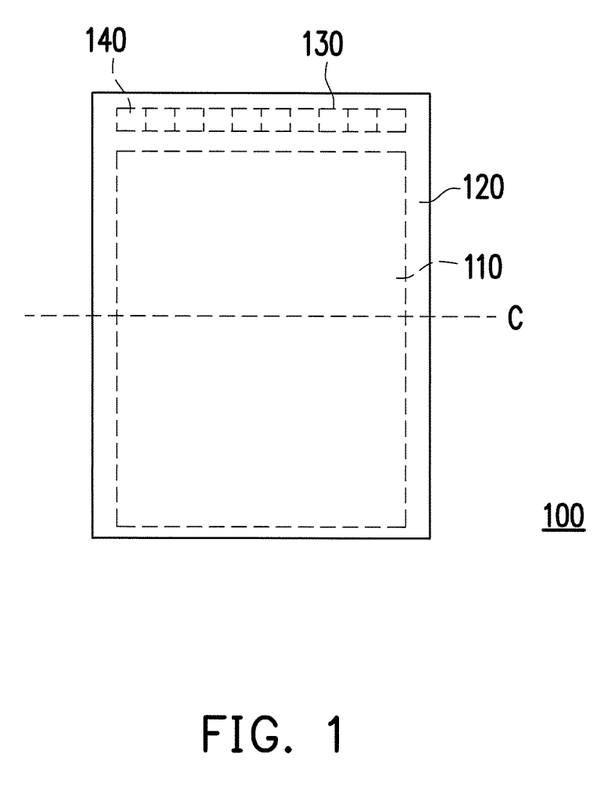
FIG. 1 is a schematic front view of a reflective display apparatus of the first embodiment of the invention.
Figure 2:
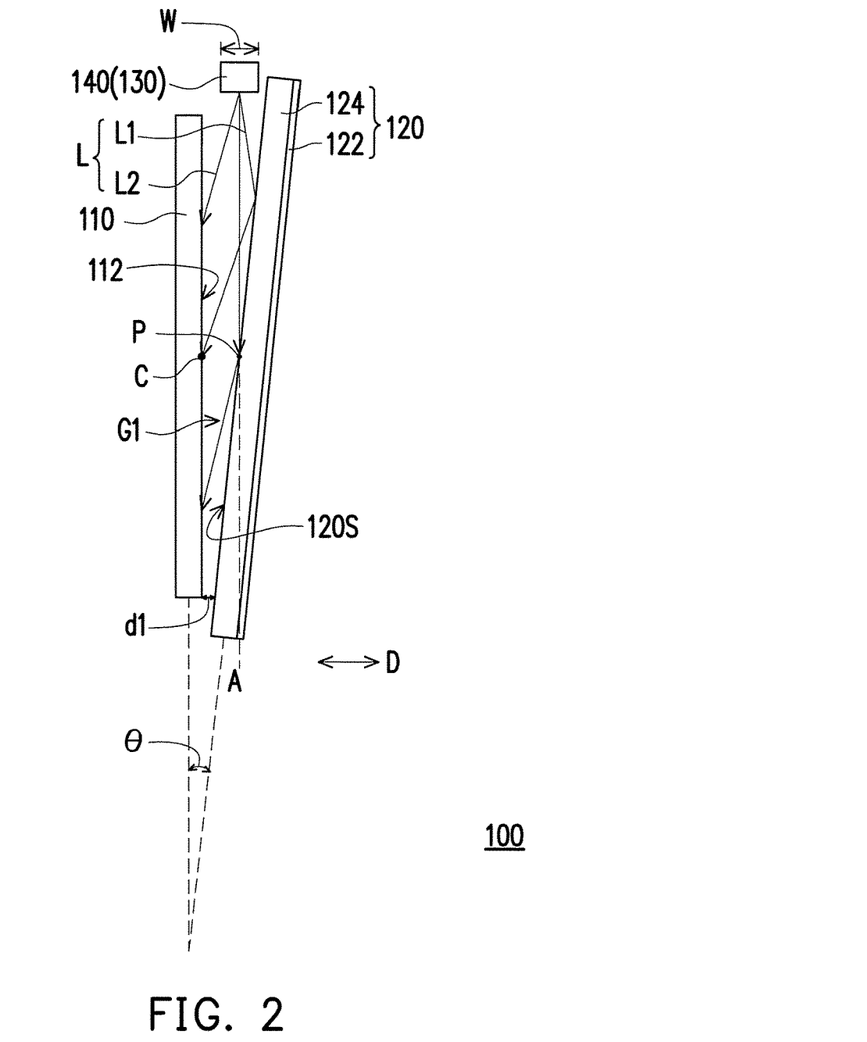
FIG. 2 is a schematic side view of the reflective display apparatus of FIG. 1.

FIG. 1 is a schematic front view of a reflective display apparatus of the first embodiment of the invention. FIG. 2 is a schematic side view of the reflective display apparatus of FIG. 1. Referring to FIG. 1 and FIG. 2, in the present embodiment, a reflective display apparatus 100 includes a reflective display panel 110, a transparent cover plate 120, and a light source 130. The reflective display panel 110 is, for example, an electro-phoretic display panel (EPD panel). The transparent cover plate 120 is disposed on one side of the reflective display panel 110. Practically, the transparent cover plate 120 is disposed on one side of a display surface 112 of the reflective display panel 110, meaning that the transparent cover plate 120 is located above the display surface 112. An air gap G1 exists between the reflective display panel 110 and the transparent cover plate 120, and the light source 130 is disposed between the reflective display panel 110 and the transparent cover plate 120 and is located in the air gap G1. For instance, the transparent cover plate 120 may lean against the light source 130 or other support structures (not shown), such that the transparent cover plate 120 is not entirely attached to the display surface 112 of the reflective display panel 110, and that the air gap G1 between the reflective display panel 110 and the transparent cover plate 120 is formed.

The transparent cover plate 120 may be a polygonal cover plate. Moreover, the transparent cover plate 120 is inclined at an angle θ relative to the reflective display panel 110, and the angle θ is greater than 0 degree and less than 45 degrees. A material of the transparent cover plate 120 may be a transparent plastic material, for example, polycarbonate (PC), polymethylmethacrylate (PMMA), or other transparent plastic materials. Alternatively, a glass material may be selected to manufacture the transparent cover plate 120, such as soda-lime glass, low iron glass, quartz glass, aluminosilicate glass, etc., but the invention is not limited thereto.

The transparent cover plate 120 may include a functional coated film 122 and a cover plate body 124, and the functional coated film 122 is disposed on the cover plate body 124. The functional coated film 122 may provide specific functions as required, for example, anti-reflection, anti-glare, anti-fingerprint, anti-stain, and/or other functions. The functional coated film 122 may be a composite coated film and is equipped with at least two of the foregoing functions. The functional coated film 122 may be disposed on one side of the transparent cover plate 120 adjacent to a user or a viewer, but the invention is not limited thereto. In alternative embodiments, the functional coated film 122 may be disposed on one side of the transparent cover plate 120 adjacent to the reflective display panel 110. In another embodiment, the functional coated film 122 may be directly formed on the transparent cover plate 120.

The light source 130 is disposed between the reflective display panel 110 and the transparent cover plate 120. The light source 130 includes a plurality of light emitting elements 140, and the light emitting element 140 are arranged in a row. It thus can be seen that the light source 130 of the present embodiment is, for example, a strip light source. The light source 130 may be disposed corresponding to one of the edges of the transparent cover plate 120. In some embodiments, the light emitting elements 140 may respectively be light emitting elements which are adapted to emit light and can be arranged in a row to form a strip light source. For instance, each of the light emitting elements 140 can be a light emitting diode but is not limited thereto.

Figure 3:
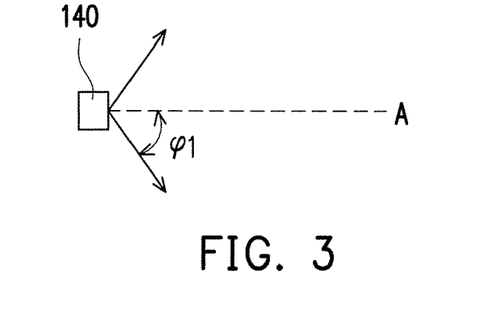
FIG. 3 is a schematic view showing a half intensity emission angle of a single light emitting element in FIG. 1.

FIG. 3 is a schematic view showing a half intensity emission angle of a single light emitting element in FIG. 1. Referring to FIG. 2 and FIG. 3, in the present embodiment, each of the light emitting elements 140 respectively has an optical axis A, and each of the light emitting elements 140 may be positioned and orientated in a manner that the optical axis A is parallel to the display surface 112 of the reflective display panel 110. Generally, when the light emitting element 140 is a light emitting diode, the optical axis A may be a virtual axis passing through a center of an illuminating surface of the light emitting diode and perpendicular to the illuminating surface. Alternatively, the optical axis A may be a virtual axis defined through a measuring result after measuring light emitting parameters of the light emitting element 140. In the present embodiment, a respective half intensity emission angle φ1 of each of the light emitting elements 140 is less than 60 degrees. For instance, the respective half intensity emission angle φ1 of each of the light emitting elements 140 may be 55 degrees.

It can be seen in FIG. 2 that the light source 130 is sandwiched between the reflective display panel 110 and the transparent cover plate 120 and is adapted to emit a light L towards the air gap G1. As such, the light L emitted by the light source 130 travels in the air gap G1 between the reflective display panel 110 and the transparent cover plate 120 before irradiating the transparent cover plate 120 or the reflective display panel 110. Specifically, the light L emitted by the light source 130 is not a parallel light beam but has a certain divergent angle. Accordingly, part of the light (the light L1) irradiates a surface 120S of the transparent cover plate 120 adjacent to the reflective display panel 110, and part of the light (the light L2) irradiates the display surface 112 of the reflective display panel 110. The light L1 is reflected by the surface 120S of the transparent cover plate 120 and thus further irradiates the display surface 112 of the reflective display panel 110. As such, the light L1 and the light L2 may both irradiate the display surface 112 of the reflective display panel 110 so as to serve as the display light of the reflective display panel 110. Therefore, an amount of the light L irradiating on the display surface 112 may be increased through the reflection of the transparent cover plate 120, such that brightness of a display image is enhanced, and that the reflective display apparatus 100 may achieve favorable display effect. The transparent cover plate 120 is transparent, and thus, part of the light L may be emitted directly from the transparent cover plate 120, and the light reflected by the reflective display panel 110 may also penetrate through the transparent cover plate 120, such that the display image can be viewed by the user or the viewer.

Since the transparent cover plate 120 is inclined at the angle θ relative to the reflective display panel 110, compared to the light L2, the light L1 is able to irradiate an area in the reflective display panel 110 relatively distant from the light source 130 after being reflected by the transparent cover plate 120. Display brightness shown by the area relatively distant from the light source 130 in the reflective display panel 110 is thereby increased. As such, display effect of the reflective display apparatus 100 may be more uniform with the dispositions of the light source 130 and the transparent cover plate 120.

In some embodiments, in a direction D perpendicular to the reflective display panel 110, a shortest distance d1 between the reflective display panel 110 and the transparent cover plate 120 satisfies 0≤d1<W, and W is a height of the light emitting element 140 measured in the direction D. As such, the transparent cover plate 120 is inclined at an angle θ relative to the reflective display panel 110. In the embodiment in which the shortest distance d1 is 0, one end of the reflective display panel 110 may lean against the transparent cover plate 120, and the light source 130 is located on an opposite end of the reflective display panel 110. In some embodiments, one end of the reflective display panel 110 adjacent to the light source 130 may be separated from the transparent cover plate 120 by 3.5 cm, and another end of the reflective display panel 110 distant from the light source 130 may be separated from the transparent cover plate 120 by 3 cm (i.e., the shortest distance d1 is 3 cm). Nevertheless, the above illustration is merely exemplary, which should not be construed as limitations to the present embodiment.

In addition, when a center line C of the display surface 112 is defined as a virtual line dividing a display area of the reflective display panel 110 into two equal parts, an inclination of the transparent cover plate 120 may be designed to enable the optical axis A of each of the light emitting elements 140 and the transparent cover plate 120 to intersect in a cross point P. Moreover, an orthogonal projection of the cross point P on the reflective display panel 110 is located on the center line C of the display surface 112 of the reflective display panel 110. Such an arrangement is conducive to enhance the brightness of the display image shown on the area in the reflective display panel 110 distant from the light source 130, and overall display effect of the reflective display apparatus 100 may be more uniform. In addition, the inclination of the transparent cover plate 120 relative to the reflective display panel 110 may be adjusted according to requirements or types of the light source. As such, the display surface 112 of the reflective display panel 110 obtains more of the light source L1 reflected by the transparent cover plate 120, or the light L emitted by the light source 130 may more uniformly irradiate the display surface 112 of the reflective display panel 110. A favorable display effect is thus further achieved.

Figure 4:
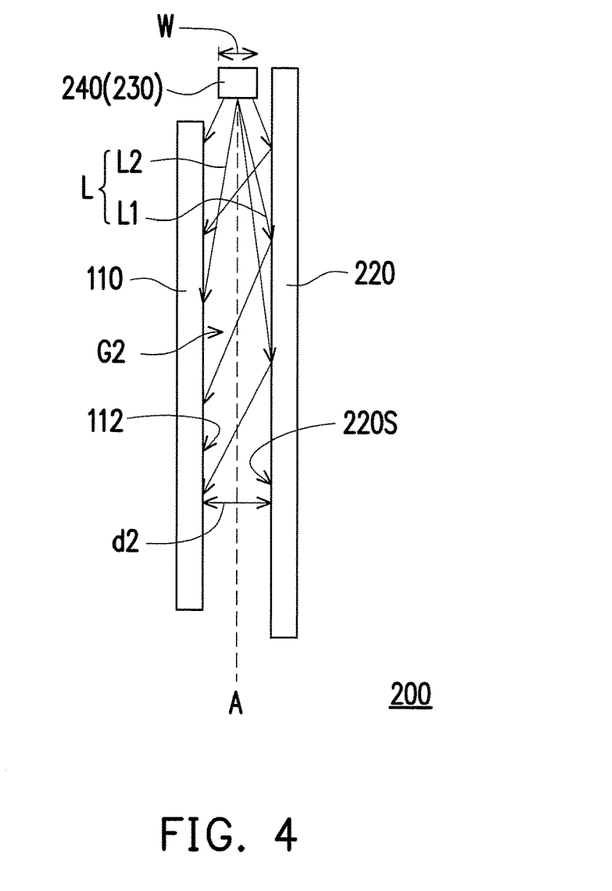
FIG. 4 is a schematic side view of a reflective display apparatus of the second embodiment of the invention.
Figure 5:
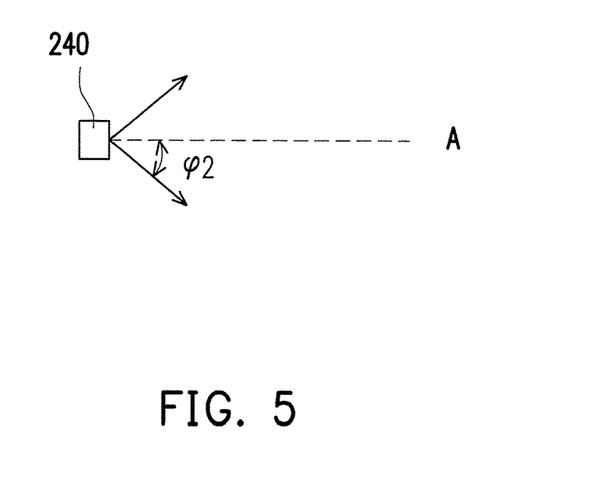
FIG. 5 is a schematic view of a half intensity emission angle of a single light emitting element in FIG. 4.

FIG. 4 is a schematic side view of a reflective display apparatus of the second embodiment of the invention. FIG. 5 is a schematic view of a half intensity emission angle of a single light emitting element in FIG. 4. Referring to FIG. 1, FIG. 4, and FIG. 5, a reflective display apparatus 200 of the present embodiment is similar to the reflective display apparatus 100 of FIG. 1. The reflective display apparatus 200 includes the reflective display panel 110, a transparent cover plate 220, and a light source 230. A difference between the reflective display apparatus 200 and the reflective display apparatus 100 of FIG. 1 is that, for example, the transparent cover plate 220 of the reflective display apparatus 200 is parallel to the reflective display panel 110, and the light source 230 may be implemented by adopting light emitting elements 240 of different specifications. Specifically, the transparent cover plate 220 is disposed parallel to the reflective display panel 110 on one side, such that an air gap G2 exits between the display surface 112 of the reflective display panel 110 and the transparent cover plate 220. The light source 230 is disposed between the reflective display panel 110 and the transparent cover plate 220, and the light source 230 is adapted to emit the light L towards the air gap G2.

A distance d2 between the reflective display panel 110 and the transparent cover plate 220 satisfies W<d2<2W, and W is a height of the light emitting element 240 measured in the direction D. For instance, the distance d2 between the reflective display panel 110 and the transparent cover plate 220 may be 3 cm but may also be adjusted according to different design requirements. Besides, the light source 230 of the present embodiment includes at least one of the light emitting elements 240 as shown in FIG. 5, and a respective half intensity emission angle φ2 of each of the light emitting elements 240 is less than 45 degrees. For instance, the respective half intensity emission angle each φ2 of each of the light emitting elements 240 can be 40 degrees. As such, part of the light L1 irradiates a surface 220S of the transparent cover plate 220 adjacent to the display surface 112, and part of the light L2 irradiates the display surface 112 of the reflective display panel 110. Moreover, when irradiating the surface 220S of the transparent cover plate 220 in an oblique direction, the light L1 is reflected by the surface 220S and thus further irradiates the display surface 112 of the reflective display panel 110. As such, the light L1 and the light L2 can both irradiate the display surface 112 so as to serve as light for display. In other words, in the present embodiment, an amount of the light L irradiating on the display surface 112 may be increased through reflection of the light L by the transparent cover plate 220, such that the reflective display apparatus 200 achieves favorable display effect. In addition, the light L1 is reflected by the transparent cover plate 220, such that the light L1 is able to irradiate an area of the reflective display panel 110 distant from the light source 230, and display brightness of the reflective display apparatus 200 is thereby more uniform.

Figure 6:
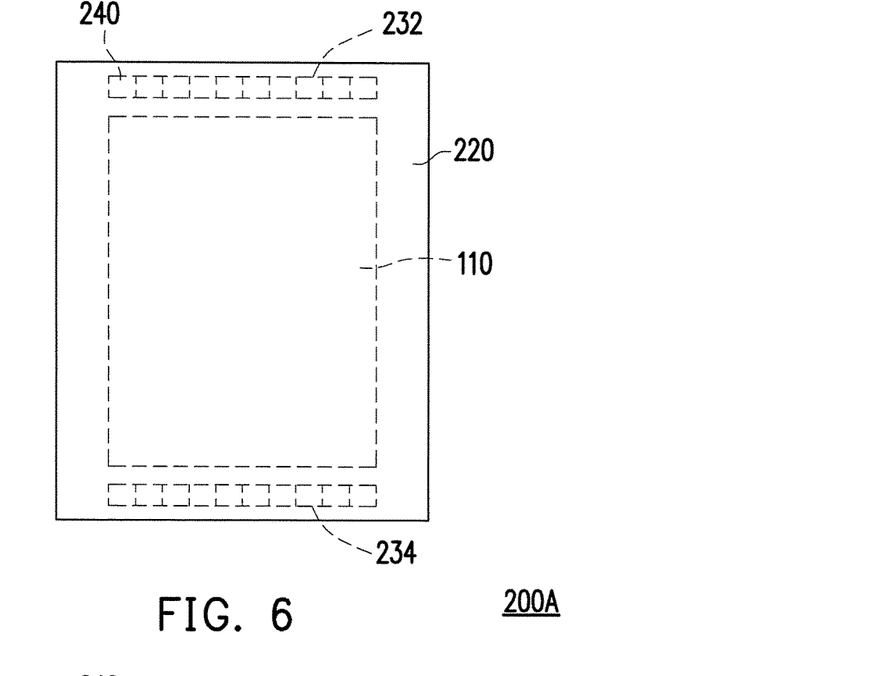
FIG. 6 is a schematic front view of a reflective display apparatus of the third embodiment of the invention.

FIG. 6 is a schematic front view of a reflective display apparatus of the third embodiment of the invention. Referring to FIG. 6, a reflective display apparatus 200A of the present embodiment is similar to the reflective display apparatus 200 of FIG. 4 and has a reflective display panel 110 and the transparent cover plate 220 disposed in parallel. But a difference therebetween is that the reflective display apparatus 200A includes a first light source 232 and a second light source 234. The first light source 232 and the second light source 234 are disposed between the reflective display panel 110 and the transparent cover plate 220 and are respectively located on two opposite ends of the transparent cover plate 220. Here, an illuminating direction of the first light source 232 is opposite to an illuminating direction of the second light source 234. In other words, the reflective display apparatus 200A is equipped with two light sources respectively disposed on two opposite ends, and the two light sources emit light in directions towards each other. The first light source 232 and the second light source 234 respectively include the light emitting elements 240, and each of the light emitting elements 240 has the half intensity emission angle φ2 less than 45 degrees as shown in FIG. 5. As such, part of the light emitted by the first light source 232 and the second light source 234 may irradiate the transparent cover plate 220 in oblique directions and then are reflected by the transparent cover plate 220 to irradiate the reflective display panel 110, so as to serve as a light required by the display screen. As such, the reflective display apparatus 200A of the present embodiment may achieve favorable display effect.

Figure 7:
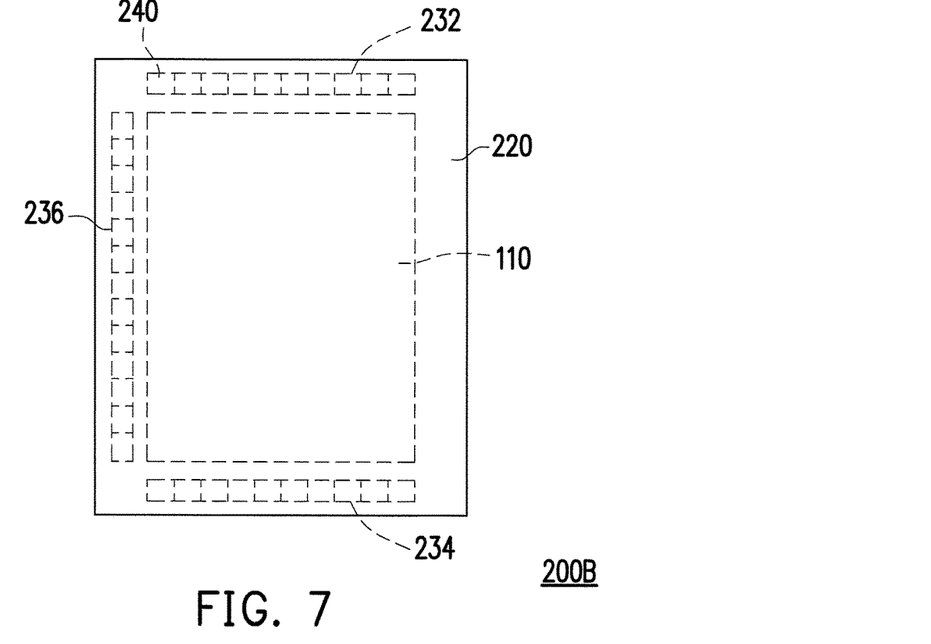
FIG. 7 is a schematic front view of a reflective display apparatus of the fourth embodiment of the invention.

FIG. 7 is a schematic front view of a reflective display apparatus of the fourth embodiment of the invention. Referring to FIG. 7, a reflective display apparatus 200B of the present embodiment is similar to the reflective display apparatus 200A of FIG. 6 and has the reflective display panel 110 and the transparent cover plate 220 disposed in parallel. But a difference therebetween is that the reflective display apparatus 200B includes the first light source 232, the second light source 234, and a third light source 236. The first light source 232, the second light source 234, and the third light source 236 are disposed between the reflective display panel 110 and the transparent cover plate 220. Moreover, the first light source 232, the second light source 234, and the third light source 236 are disposed corresponding to three sides of the transparent cover plate 220.

Specifically, the first light source 232 and the second light source 234 are respectively located on two opposite ends of the transparent cover plate 220, and the illuminating direction of the first light source 232 is opposite to the illuminating direction of the second light source 234. The third light source 236 is located between the first light source 232 and the second light source 234. In other words, the reflective display apparatus 200B is equipped with three light sources disposed on edges of the transparent cover plate 220, and the three light sources are arranged in a C-letter shape and all emit light towards a center of the reflective display apparatus 200B. In the present embodiment, an opening direction of the C-letter shape may be selected according to usage conditions and should not be limited to the arrangement shown in FIG. 7.

The first light source 232, the second light source 234, and the third light source 236 respectively include the light emitting elements 240, and each of the light emitting elements 240 has the half intensity emission angle φ2 less than 45 degrees, for example, as shown in FIG. 5. As such, part of the light emitted by the first light source 232, the second light source 234, and the third light source 236 may irradiate the transparent cover plate 220 in oblique directions and then are reflected by the transparent cover plate 220 to irradiate the reflective display panel 110, so as to serve as a light required by the display screen. As such, the reflective display apparatus 200B may achieve favorable display effect.

Figure 8:
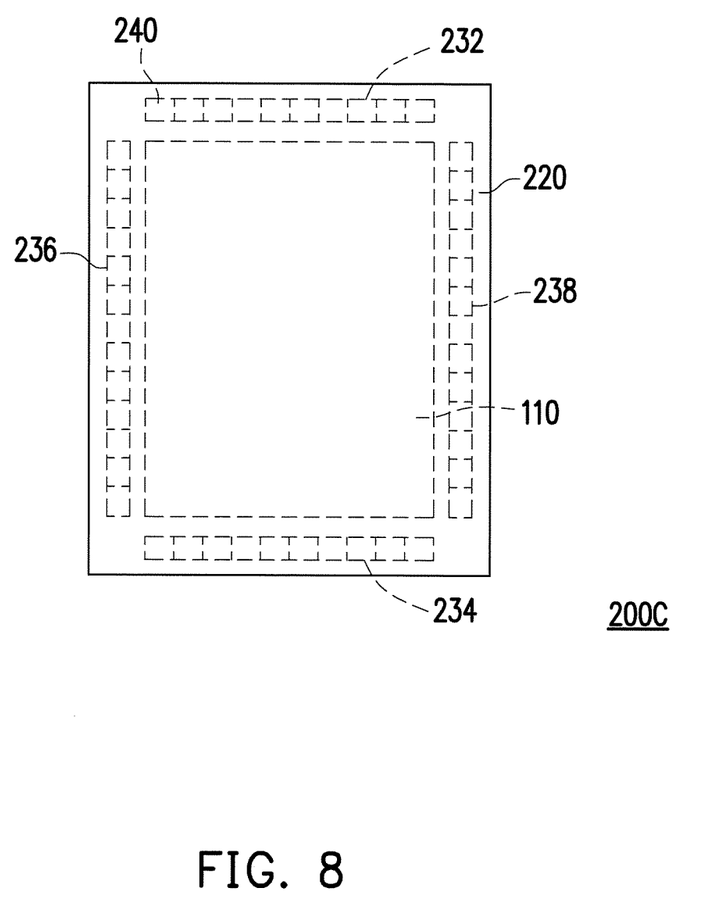
FIG. 8 is a schematic front view of a reflective display apparatus of the fifth embodiment of the invention.

FIG. 8 is a schematic front view of a reflective display apparatus of the fifth embodiment of the invention. Referring to FIG. 8, a reflective display apparatus 200C of the present embodiment is similar to the reflective display apparatus 200A of FIG. 6 and has the reflective display panel 110 and the transparent cover plate 220 disposed in parallel. But a difference therebetween is that the reflective display apparatus 200C includes the first light source 232, the second light source 234, the third light source 236, and a fourth light source 238. The first light source 232, the second light source 234, the third light source 236, and the fourth light source 238 are disposed between the reflective display panel 110 and the transparent cover plate 220. The first light source 232, the second light source 234, the third light source 236, and the fourth light source 238 are arranged in a ring shape and surround the edges of the transparent cover plate 220. In other words, the reflective display apparatus 200C is equipped with four light sources disposed on the edges of the transparent cover plate 220, and the four light sources are arranged in a manner that opposite light sources are parallel to each other and surround the edges of the reflective display panel 110.

The first light source 232, the second light source 234, the third light source 236, and the fourth light source 238 respectively include the light emitting elements 240, and each of the light emitting elements 240 has the half intensity emission angle φ2 less than 45 degrees, for example, as shown in FIG. 5. As such, part of the light emitted by the first light source 232, the second light source 234, the third light source 236, and the fourth light source 238 may irradiate the transparent cover plate 220 in oblique directions and then are reflected by the transparent cover plate 220 to irradiate the reflective display panel 110, so as to serve as a light required by the display screen. As such, the reflective display apparatus 200C may achieve favorable display effect.

In view of the foregoing, in the reflective display apparatus in accordance with the embodiments of the invention, the light emitted by the light source may be reflected to the reflective display panel through the transparent cover plate, so as to enhance display brightness and achieve uniform display effect. In addition, the light emitting elements with more concentrated emission angles are selected, which is also conducive to achieving uniform display effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A reflective display apparatus, comprising:
   a reflective display panel;
   a transparent cover plate disposed on one side of the reflective display panel, an air gap existing between the reflective display panel and the transparent cover plate; and
   a light source disposed between the reflective display panel and the transparent cover plate, a light emitted by the light source traveling towards the air gap before irradiating the transparent cover plate or the reflective display panel,
   wherein the transparent cover plate is inclined at an angle relative to the reflective display panel, and the angle is greater than 0 degree and less than 45 degrees.

2. The reflective display apparatus as claimed in claim 1, wherein the light source comprises at least one light emitting element, the at least one light emitting element respectively has an optical axis, and the optical axis is parallel to a display surface of the reflective display panel.

3. The reflective display apparatus as claimed in claim 1, wherein the light source comprises at least one light emitting element, and a respective half intensity emission angle of the at least one light emitting element is less than 60 degrees.

4. The reflective display apparatus as claimed in claim 1, wherein the light source comprises at least one light emitting element, a respective optical axis of the at least one light emitting element and the transparent cover plate intersect to form a cross point, and an orthogonal projection of the cross point on the reflective display panel is located on a center line of a display surface of the reflective display panel.

5. The reflective display apparatus as claimed in claim 1, wherein the light source comprises at least one light emitting element, a shortest distance d1 between the reflective display panel and the transparent cover plate satisfies 0≤d1<W in a direction perpendicular to the reflective display panel, wherein W is a height of the at least one light emitting element in the direction.

6. The reflective display apparatus as claimed in claim 1, wherein one end of the reflective display panel leans against the transparent cover plate, and the light source is located on an opposite end of the reflective display panel.

7. A reflective display apparatus, comprising: a reflective display panel;
a transparent cover plate disposed on one side of the reflective display panel, an air gap existing between the reflective display panel and the transparent cover plate; and
a light source disposed between the reflective display panel and the transparent cover plate, a light emitted by the light source traveling towards the air gap before irradiating the transparent cover plate or the reflective display panel,
wherein the reflective display panel is parallel to the transparent cover plate, and
wherein the light source comprises at least one light emitting element, and a respective half intensity emission angle of the at least one light emitting element is less than 45 degrees.

8. The reflective display apparatus as claimed in claim 7, wherein a distance d2 between the reflective display panel and the transparent cover plate satisfies W<d2<2W, wherein W is a height of the at least one light emitting element in a direction perpendicular to the reflective display panel.

9. The reflective display apparatus as claimed in claim 8, wherein the light source is divided into a first light source and a second light source respectively located at opposite ends of the transparent cover plate, wherein an illuminating direction of the first light source is opposite to an illuminating direction of the second light source.

10. The reflective display apparatus as claimed in claim 8, wherein the light source is divided into a first light source, a second light source, and a third light source, wherein the first light source and the second light source are located on opposite ends of the transparent cover plate, an illuminating direction of the first light source is opposite to an illuminating direction of the second light source, and the third light source is located between the first light source and the second light source to be arranged in a C-letter shape.

11. The reflective display apparatus as claimed in claim 8, wherein the light source is divided into a first light source, a second light source, a third light source, and a fourth light source, and the first light source, the second light source, the third light source, and the fourth light source are arranged in a ring shape and surround an edge of the transparent cover plate.

12. The reflective display apparatus as claimed in claim 1, wherein a functional coated film is formed on a side surface of the transparent cover plate.

13. The reflective display apparatus as claimed in claim 1, wherein the transparent cover plate comprises a cover plate body and a functional coated film, and the functional coated film is disposed on the cover plate body.

14. The reflective display apparatus as claimed in claim 7, wherein the at least one light emitting element respectively has an optical axis, and the optical axis is parallel to a display surface of the reflective display panel.

15. The reflective display apparatus as claimed in claim 7, wherein a functional coated film is formed on a side surface of the transparent cover plate.

16. The reflective display apparatus as claimed in claim 7, wherein the transparent cover plate comprises a cover plate body and a functional coated film, and the functional coated film is disposed on the cover plate body.

* * * * *